(12) United States Patent
Suh et al.

(10) Patent No.: US 12,225,616 B2
(45) Date of Patent: Feb. 11, 2025

(54) METHOD AND DEVICE FOR PROCESSING NAS MESSAGE INFORMATION IN WIRELESS COMMUNICATION SYSTEM

(71) Applicant: Samsung Electronics Co., Ltd., Suwon-si (KR)

(72) Inventors: Kyungjoo Suh, Suwon-si (KR); Kisuk Kweon, Suwon-si (KR); Sunghoon Kim, Suwon-si (KR); Sangjun Moon, Suwon-si (KR); Yoonseon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 335 days.

(21) Appl. No.: 17/310,100

(22) PCT Filed: Feb. 13, 2020

(86) PCT No.: PCT/KR2020/002065
§ 371 (c)(1),
(2) Date: Jul. 16, 2021

(87) PCT Pub. No.: WO2020/167008
PCT Pub. Date: Aug. 20, 2020

(65) Prior Publication Data
US 2022/0124862 A1    Apr. 21, 2022

(30) Foreign Application Priority Data
Feb. 15, 2019   (KR) .................. 10-2019-0018146

(51) Int. Cl.
*H04W 76/25* (2018.01)
*H04W 60/04* (2009.01)
*H04W 68/00* (2009.01)

(52) U.S. Cl.
CPC .......... *H04W 76/25* (2018.02); *H04W 60/04* (2013.01); *H04W 68/005* (2013.01)

(58) Field of Classification Search
None
See application file for complete search history.

(56) References Cited

U.S. PATENT DOCUMENTS

| 9,860,067 B2 | 1/2018 | Piqueras Jover et al. |
| 2018/0376384 A1 | 12/2018 | Youn et al. |

(Continued)

FOREIGN PATENT DOCUMENTS

| CN | 109155909 A | 1/2019 |
| WO | 2018/206080 A1 | 11/2018 |

OTHER PUBLICATIONS

Communication pursuant to Article 94(3) EPC dated Jan. 2, 2023 in connection with European Patent Application No. 20 755 961.8, 6 pages.

(Continued)

*Primary Examiner* — Alex Skripnikov

(57) ABSTRACT

The disclosure provides a method, performed by a user equipment (UE), of processing a non-access stratum (NAS) message, the method including: receiving a paging request message from an access and mobility management function (AMF); transmitting a service request message to the AMF; receiving a service accept message from the AMF; receiving a session management message from a session management function (SMF); and after receiving the session management message, receiving a UE configuration update command message from the AMF.

12 Claims, 6 Drawing Sheets

(56) References Cited

U.S. PATENT DOCUMENTS

| | | | |
|---|---|---|---|
| 2018/0376444 A1* | 12/2018 | Kim | .................. H04W 36/0022 |
| 2019/0007500 A1 | 1/2019 | Kim et al. | |
| 2019/0007992 A1 | 1/2019 | Kim et al. | |
| 2019/0028961 A1 | 1/2019 | Faccin et al. | |
| 2019/0116486 A1* | 4/2019 | Kim | ........................ H04W 8/10 |
| 2019/0373441 A1 | 12/2019 | Ryu et al. | |
| 2020/0162919 A1* | 5/2020 | Velev | .................. H04W 12/084 |

OTHER PUBLICATIONS

European Patent Office, "Supplementary European Search Report" issued Jan. 18, 2022, in connection with European Patent Application No. 20755961.8, 9 pages.

Korean Intellectual Property Office, "Grounds for Rejection," issued May 23, 2023, in connection with Korean Patent Application No. 10-2019-0018146, 5 pages.

Translation of Written Opinion of the International Searching Authority dated May 25, 2020, in connection with International Application No. PCT/KR2020/002065, 5 pages.

International Search Report and Written Opinion of the International Searching Authority in connection with International Application No. PCT/KR2020/002065 issued May 25, 2020, 10 pages.

3rd Generation Partnership Project, Technical Specification Group Core Network and Terminals, Non-Access-Stratum (NAS) protocol for 5G System (5GS), Stage 3 (Release 15), 3GPP TS 24.501 V15.2.1, Jan. 2019, 455 pages.

3rd Generation Partnership Project, Technical Specification Group Services and System Aspects, Procedures for the 5G System, Stage 2 (Release 15) 3GPP TS 23.502 V15.4.1, Jan. 2019, 347 pages.

Notice Of Allowance dated Nov. 6, 2023, in connection with Korean Patent Application No. 10-2019-0018146, 11 pages.

Communication under Rule 71(3) EPC dated Sep. 19, 2024, in connection with European Patent Application No. 20 755 961.8, 36 pages.

* cited by examiner

METHOD AND DEVICE FOR PROCESSING NAS MESSAGE INFORMATION IN WIRELESS COMMUNICATION SYSTEM

CROSS-REFERENCE TO RELATED APPLICATIONS

This application is a 371 of International Application No. PCT/KR2020/002065, filed Feb. 13, 2020, which claims priority to Korean Patent Application No. 10-2019-0018146, filed Feb. 15, 2019, the disclosures of which are herein incorporated by reference in their entirety.

BACKGROUND

1. Field

The disclosure relates to a method and device for processing a non-access stratum (NAS) message in a wireless communication system.

2. Description of Related Art

To meet increasing demand with respect wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. The 5G communication system defined in the $3^{rd}$ Generation Partnership Project (3GPP) is called a New Radio (NR) system. To achieve high data rates, implementation of 5G communication systems in an ultra-high frequency or millimeter-wave (mmWave) band (e.g., a 60-gigahertz (GHz) band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied and applied to the NR system. To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, 5G communication such as sensor networks, M2M communication, MTC, and the like is being implemented by using techniques including beamforming, MIMO, array antennas, and the like. Application of cloud radio access network (Cloud-RAN) as the above-described big data processing technology may be an example of convergence of 5G communication technology and IoT technology.

As various services can be provided due to the aforementioned technical features and development of mobile communication systems, there is a demand for a method for effectively providing the services.

SUMMARY

Embodiments of the disclosure provide a device and method for effectively providing a service in a mobile communication system.

Embodiments of the disclosure provide a method and device for processing a non-access stratum (NAS) message in a wireless communication system.

Embodiments of the disclosure provide a method and device for effectively providing a service in a mobile communication system.

DETAILED DESCRIPTION

Figure 1:
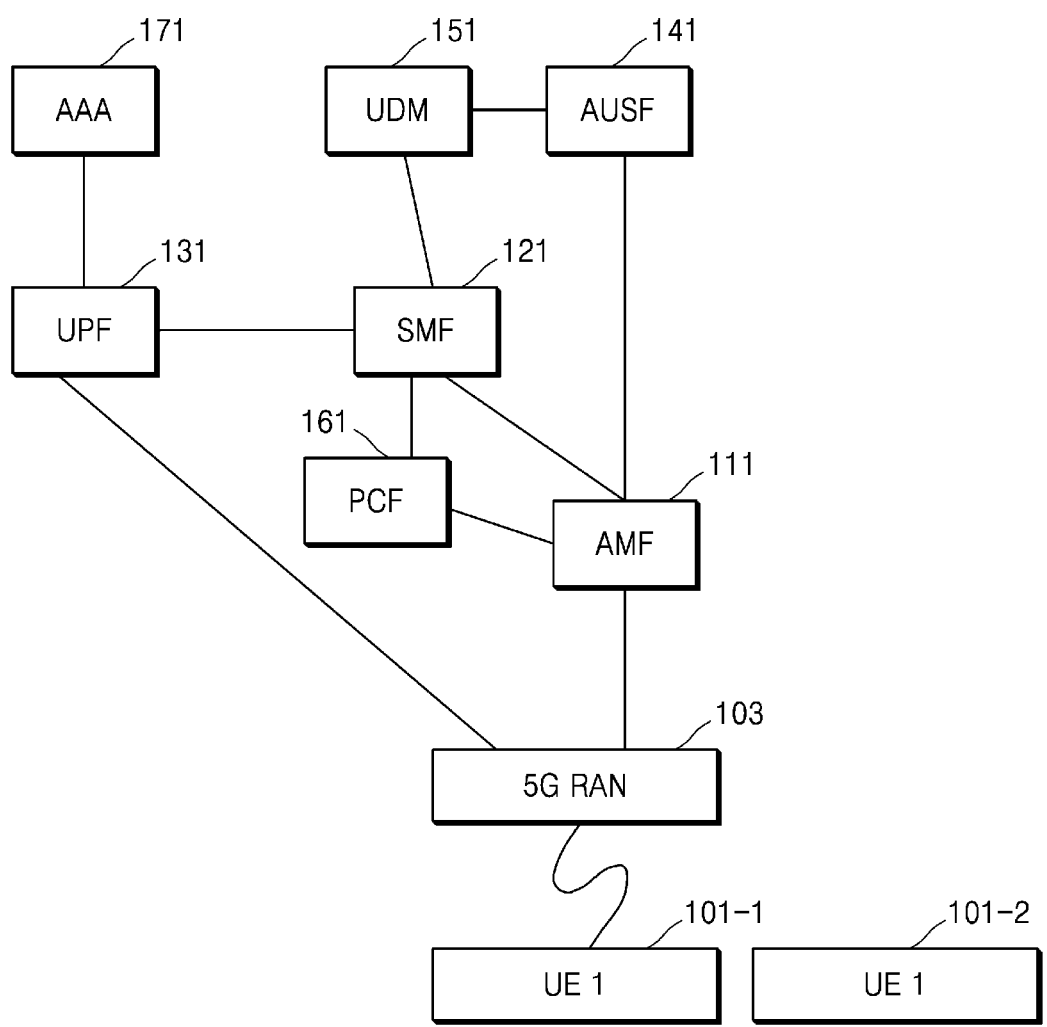
FIG. 1 illustrates an example of a communication procedure, user equipments (UEs) for communication, and a network environment for performing communication with improved communication performance in a $5^{th}$ generation (5G) network according to an embodiment of the disclosure.

According to an embodiment of the disclosure, a method, performed by a user equipment (UE), of processing a non-access stratum (NAS) message may include: receiving a paging request message from an access and mobility management function (AMF); transmitting a service request message to the AMF; receiving a service accept message from the AMF; receiving a session management message from a session management function (SMF); and after receiving the session management message, receiving a UE configuration update command message from the AMF.

The transmitting of the service request message to the AMF may include transmitting the service request message while the session management message from the SMF to the UE is pending.

The method may further include: transmitting a registration request message to the AMF; and receiving a registration accept message from the AMF.

The UE configuration update command message may include a new $5^{th}$ generation-global unique temporary identifier (5G-GUTI) assigned to the UE.

According to an embodiment of the disclosure, a method, performed by an access and mobility management function (AMF), of processing a non-access stratum (NAS) message may include: transmitting a paging request message to a user equipment (UE); receiving a service request message from the UE; transmitting a service accept message to the UE; transmitting, to the UE, a session management message received from a session management function (SMF); and after transmitting the session management message, transmitting a UE configuration update command message to the UE.

The receiving of the service request message from the UE may include receiving the service request message while the session management message from the SMF to the UE is pending.

The method may further include: receiving a registration request message from the UE; and transmitting a registration accept message to the UE.

The UE configuration update command message may include a new $5^{th}$ generation-global unique temporary identifier (5G-GUTI) assigned to the UE.

According to an embodiment of the disclosure, a user equipment (UE) for processing a non-access stratum (NAS) message may include: a transceiver; and a processor combined with the transceiver and configured to receive a paging request message from an access and mobility management function (AMF), transmit a service request message to the AMF, receive a service accept message from the AMF, receive a session management message from a session management function (SMF), and after receiving the session management message, receive a UE configuration update command message from the AMF.

The processor may be configured to transmit the service request message to the AMF while the session management message from the SMF to the UE is pending.

The processor may be configured to transmit a registration request message to the AMF, and receive a registration accept message from the AMF.

The UE configuration update command message may include a new $5^{th}$ generation-global unique temporary identifier (5G-GUTI) assigned to the UE.

According to an embodiment of the disclosure, an access and mobility management function (AMF) for processing a non-access stratum (NAS) message may include: a transceiver; and a processor combined with the transceiver and configured to transmit a paging request message to a user equipment (UE), receive a service request message from the UE, transmit a service accept message to the UE, transmit, to the UE, a session management message received from a session management function (SMF), and after transmitting the session management message, transmit a UE configuration update command message to the UE.

The processor may be configured to receive the service request message from the UE while the session management message from the SMF to the UE is pending.

The UE configuration update command message may include a new $5^{th}$ generation-global unique temporary identifier (5G-GUTI) assigned to the UE.

Mode of Disclosure

Hereinafter, exemplary embodiments of the disclosure will be described in detail with reference to accompanying drawings. In the accompanying drawings, it will be understood that like reference numerals denote like elements. Also, detailed descriptions of well-known functions and configurations in the art are omitted when it is deemed that they may unnecessarily obscure the essence of the disclosure.

In the following descriptions of embodiments in the specification, descriptions of techniques that are well known in the art and are not directly related to the disclosure are omitted. This is to clearly convey the gist of the disclosure by omitting unnecessary descriptions.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. Throughout the specification, like reference numerals denote like elements.

Hereinafter, terms identifying an access node, terms indicating network entities, terms indicating messages, terms indicating an interface between network entities, and terms indicating various pieces of identification information, as used in the following description, are exemplified for convenience of descriptions. Accordingly, the disclosure is not limited to the terms to be described below, and other terms indicating objects having equal technical meanings may be used.

In this regard, it will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in the present embodiment refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. Also, in embodiments, a "unit" may include one or more processors.

Hereinafter, for convenience of descriptions, the disclosure uses terms and names defined in the standards for the 5$^{th}$ (5G) and the long term evolution (LTE) system. However, the disclosure is not limited to these terms and names, and may be equally applied to wireless communication systems conforming to other standards.

That is, when particularly describing embodiments of the disclosure, the communication standards defined by the 3$^{rd}$ Generation Partnership Project (3GPP) are mainly applied but the essential concept of the disclosure may be modified without departing from the scope of the disclosure and may be applied to other communication system based on similar technical backgrounds, and the application may be made based on determination by one of ordinary skill in the art.

Also, hereinafter, terms identifying an access node, terms indicating network entities, terms indicating messages, terms indicating an interface between network entities, and terms indicating various pieces of identification information, as used in the following description, are exemplified for convenience of description. Accordingly, the disclosure is not limited to the terms, and other terms indicating objects having equal technical meanings may be used.

In the 5G or New Radio (NR) system, an access and mobility management function (AMF) that is a management entity for managing mobility of a UE and a session management function (SMF) that is an entity for managing a session are separate. Accordingly, unlike to an operating scheme of the 4$^{th}$ generation (4G) LTE system in which a mobility management entity (MME) manages both mobility and session, an entity for managing mobility and an entity for managing session are separate such that a communication method and a communication management method between a UE and a network entity are changed.

In the 5G or NR system, with respect to non 3GPP access, mobility management is performed by the AMF and session management is performed by the SMF via Non-3GPP Inter Working Function (N3IWF). Also, in the 5G or NR system, not only mobility management but also security-related information that is an important factor in the mobility management are managed by the AMF. In the 4G network, the MME performs both mobility management and session management. In the 5G or NR system, entities for not only the 5G communication method but also for communication between 4G and 5G exist, and in the non-standalone architecture using some 4G communication entities for 5G communication may perform 5G communication.

Accordingly, the disclosure provides a method of processing non-access stratum (NAS) messages when communication is performed using a NAS protocol in 5G communication, and more particularly, provides a method of enhancing communication performance by improving efficiency of a protocol.

According to embodiments of the disclosure, communication performance in NAS message exchange and signaling exchange in a 5G communication environment is improved, such that communication may be efficiently performed.

FIG. 1 illustrates an example of a communication procedure, UEs for communication, and a network environment for performing secured communication by using some of 4G or 5G entities in 5G and 4G networks according to an embodiment of the disclosure.

According to an embodiment of the disclosure, the 5G network system may include network entities such as a user plane function (UPF) 131, a SMF 121, an AMF 111, a 5G radio access network (RAN) 103, a user data management (UDM) 151, a policy control function (PCF) 161, and the like. To authenticate the entities, an authentication server function (AUSF) 141 and authentication, authorization and accounting (AAA) 171 may also exist in the 5G network system.

Also, according to some embodiments of the disclosure, the 5G network system may include Non-3GPP Interworking Function (N3IWF) for a case in which a UE communicates via non 3GPP access. When communicating via non 3GPP access, session management may be controlled via the UE, the non 3GPP access, the N3IWF, and the SMF, and mobility management may be controlled via the UE, the non 3GPP access, the N3IWF, and the AMF.

Also, for an embodiment of the disclosure, it is assumed that 5G system and 4G LTE system coexist. In LTE, an MME for managing mobility management and session management exists to control communication of a UE. In 5G, an entity for managing mobility management and session management is divided into an AMF and an SMF. For 5G communication, standalone deployment architecture in which only 5G communication entities perform communication, and non-standalone deployment architecture in which 4G and 5G entities are used for 5G communication are being considered.

When a UE communicates with a network, certain deployment may be available, in which communication is controlled by using eNode B (eNB) and a 5G entity of a core network is used. In this case, for NAS that is layer 3, the UE and an AMF perform mobility management and the UE and an SMF perform session management, whereas AS that is layer 2 is transmitted via the UE and the eNB, such that there is a demand for a method of generating and managing security context. Accordingly, the disclosure provides descriptions about security context generation, management, and protocol exchange which are applicable to the afore-described deployments.

It is assumed that a communication network system on which the disclosure is based is 5G and 4G LTE networks, but embodiments of the disclosure are not limited thereto, and may be applied to other systems to the extent that one of ordinary skill in the art can understand.

(Scheme 1)

Figure 2:
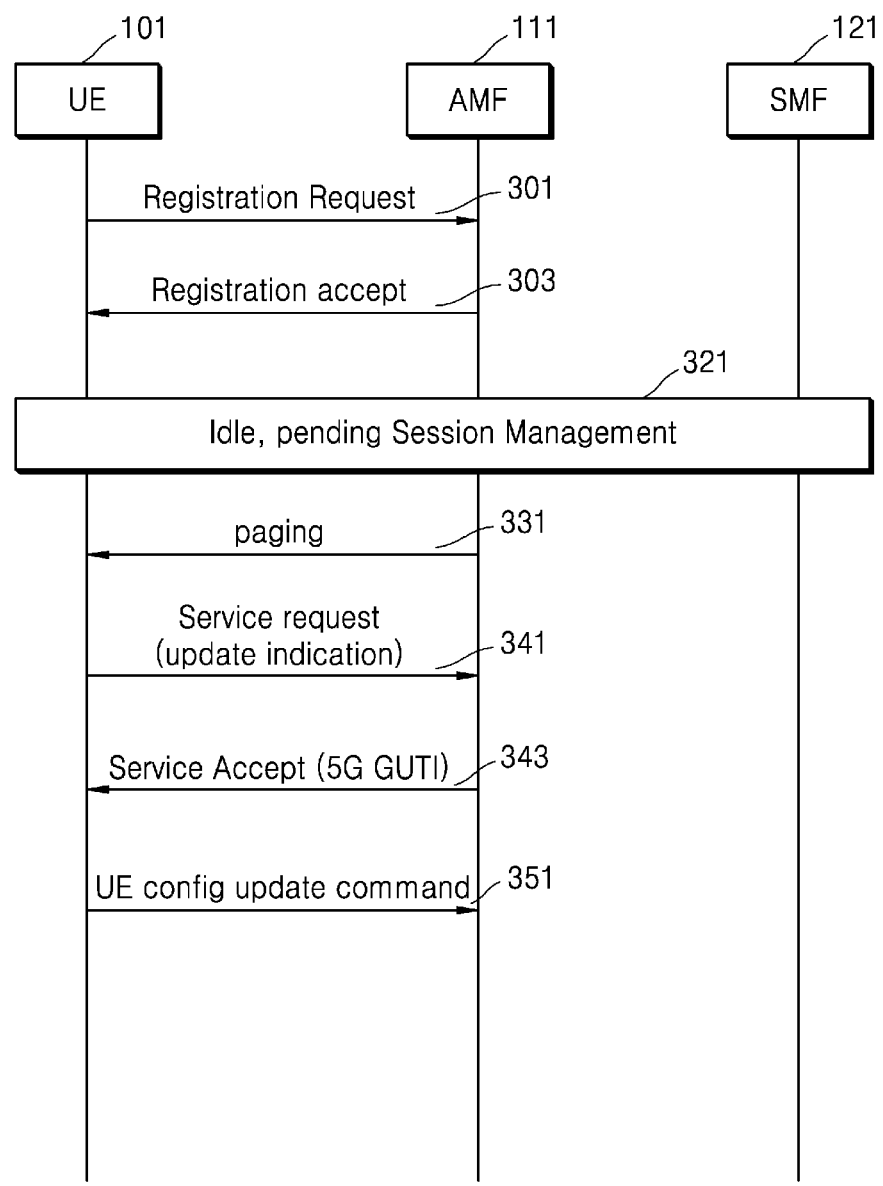
FIG. 2 illustrates a non-access stratum (NAS) message information processing and communicating procedure in a 5G network environment according to an embodiment of the disclosure.

FIG. 2 illustrates a NAS message information processing and communicating procedure in a 5G network environment according to an embodiment of the disclosure.

In operation 301, a UE 101 transmits a registration request message to an AMF 111.

In operation 303, the AMF 111 transmits a registration Accept message to the UE 101.

In operation 321, the UE 101 is in an idle state, and a session management (SM) message transmitted from an SMF 121 to the UE 101 via the AMF 111 is pending.

In operation 331, the AMF 111 performs paging with respect to the UE 101.

In operation 341, the UE 101 transmits a service request message to the AMF 111. At this time, when the UE 101 transitions from the idle state to a connected state in response to the service accept message, a legacy method involves transmitting a 5G-global unique temporary identifier (5G-GUTI) through a UE configuration update command message so as to avoid a risk of exposure of a 5G-GUTI of the UE 101 due to the idle state, but a method that is different from the legacy method involves transmitting a new update indication to notify a network that a UE can use a method of additionally transmitting a 5G-GUTI to be newly used, through the service accept message. Obviously, the update indication may be optionally included in the Service request message as shown in Table 1.

TABLE 1

Service Request

| IEI | Information Element | Type/Reference | Presence | Format | Length |
|---|---|---|---|---|---|
|  | Extended protocol discriminator | Extended protocol discriminator | M | V | 1 |
|  | Security header type | Security header type | M | V | 1/2 |
|  | Spare half octet | Spare half octet | M | V | 1/2 |
|  | Service request message identity | Message type | M | V | 1 |
|  | ngKSI | NAS key set identifier | M | V | 1/2 |
|  | Service type | Service type | M | V | 1/2 |
|  | 5G-S-TMSI | 5GS mobile identity | M | LV-E | 8 |
| 40 | Uplink data status | Uplink data status | O | TLV | 4-34 |
| 50 | PDU session status | PDU session status | O | TLV | 4-34 |
| 25 | Allowed PDU session status | Allowed PDU session status | O | TLV | 4-34 |
| 71 | NAS message container | NAS message container | O | TLV-E | 4-n |
|  | update indication | Update indication | O | TLV | 2 |

Afterward, in operation 343, the AMF 111 transmits the service accept message to the UE 101. According to an embodiment of the disclosure, the AMF 111 may transmit a 5G-GUTI to be newly used by the UE 101. Obviously, the 5G-GUTI may be optionally included in the Service accept message as shown in Table 2.

TABLE 2

Service Accept

| IEI | Information Element | Type/Reference | Presence | Format | Length |
|---|---|---|---|---|---|
|  | Extended protocol discriminator | Extended protocol discriminator | M | V | 1 |
|  | Security header type | Security header type | M | V | 1/2 |
|  | Spare half octet | Spare half octet | M | V | 1/2 |
|  | Service accept message identity | Message type | M | V | 1 |
| 50 | PDU session status | PDU session status | O | TLV | 4-34 |
| 26 | PDU session reactivation result | PDU session reactivation result | O | TLV | 4-32 |
| 72 | PDU session reactivation result error cause | PDU session reactivation result error cause | O | TLV-E | 5-515 |
| 78 | EAP message | EAP message | O | TLV-E | 7-1503 |
|  | 5G-GUTI | 5GS mobile identity | O | TLV | 8 |

Afterward, according to an embodiment of the disclosure, a process of transmitting a UE configuration update command message from the AMF 111 to the UE 101 in operation 351 may be omitted. A procedure of updating, through a UE configuration update command, information such as a 5G-GUTI which may have a risk of exposure due to the UE 101 being in the idle state is omitted, but instead, a 5G-GUTI to be used by the UE 101 is transmitted through the service accept message in operation 343 such that a delay that may occur due to failure of the UE configuration update command procedure may be decreased. Afterward, an SM message may be transmitted from the SMF 121 to the UE 101. (Scheme 2)

Figure 3:
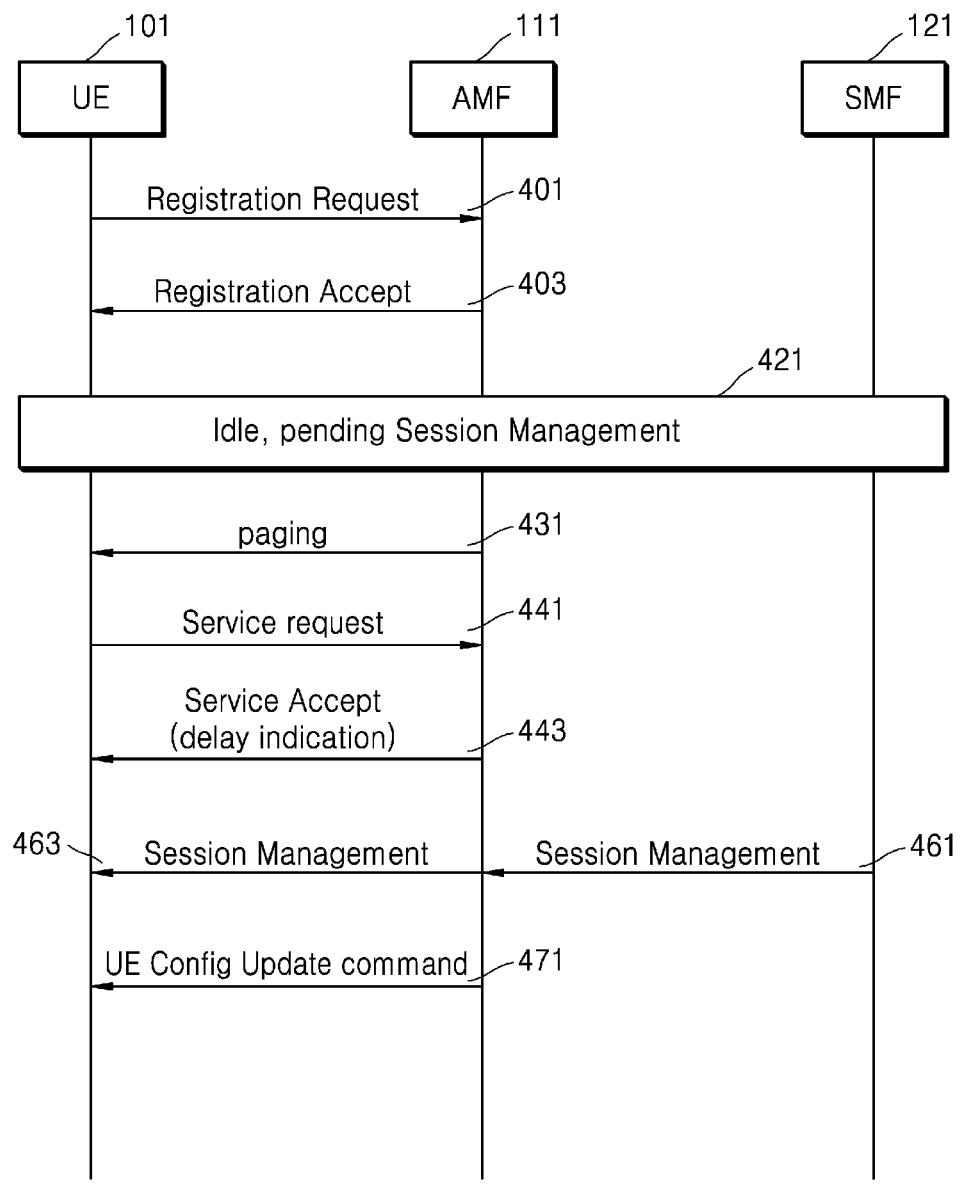
FIG. 3 illustrates a NAS message information processing and communicating procedure in a 5G network environment according to an embodiment of the disclosure.

FIG. 3 illustrates a NAS message information processing and communicating procedure in a 5G network environment according to an embodiment of the disclosure.

In operation 401, the UE 101 transmits a registration request message to the AMF 111.

In operation 403, the AMF 111 transmits a registration Accept message to the UE 101.

In operation 421, the UE 101 is in an idle state, and an SM message transmitted from the SMF 121 to the UE 101 via the AMF 111 is pending.

In operation 431, the AMF 111 performs paging with respect to the UE 101

In operation 441, the UE 101 transmits a service request message to the AMF 111.

Afterward, in operation 443, the AMF 111 transmits a service accept message to the UE 101. In this regard, according to an embodiment of the disclosure, the AMF 111 transmits a delay indication to notify that a UE configuration update command message of operation 471 for allocating a new 5G-GUTI to the UE 101 is to be delayed and transmitted after the SM message is transmitted.

The embodiment shown in FIG. 3 is provided to solve a delay problem that may occur due to multiple retry attempts to transmit a UE configuration update command when transmission of the UE configuration update command fails in a procedure in which the AMF 111 transmits the service Accept message to the UE 101 and the AMF 111 transmits the UE configuration update command to the UE 101.

That is, in a case where the AMF 111 transmits the UE configuration update command, and backoff timer T3555 starts running, if transmission of the UE configuration update command fails, transmission of the UE configuration update command is retried 4 more times and thus a total of 5 times is tried such that a delay occurs. To prevent occurrence of the delay, the embodiment of FIG. 3 may be useful.

In other words, due to T3555 timer, even when the SM message being transmitted from the SMF 121 to the UE 101 is retransmitted in response to expiry of backoff timer T3591 running at the SMF 121, because T3555 timer for the AMF 111 is running, and the SM message is pending when the UE configuration update command is transmitted from the AMF 111 to the UE 101, the AMF 111 may transmit the delay indication to the UE 101 so as to transmit the UE configuration update command message after the SM message is transmitted, as in operation 471. Obviously, the delay indication may be optionally included in the service accept message as shown in Table 3.

The service accept message thereof is as below. However, the disclosure is not limited thereto.

TABLE 3

| | Service Accept | | | | |
|---|---|---|---|---|---|
| IEI | Information Element | Type/Reference | Presence | Format | Length |
| | Extended protocol discriminator | Extended protocol discriminator | M | V | 1 |
| | Security header type | Security header type | M | V | ½ |
| | Spare half octet | Spare half octet | M | V | ½ |
| | Service accept message identity | Message type | M | V | 1 |
| 50 | PDU session status | PDU session status | O | TLV | 4-34 |
| 26 | PDU session reactivation result | PDU session reactivation result | O | TLV | 4-32 |
| 72 | PDU session reactivation result error cause | PDU session reactivation result error cause | O | TLV-E | 5-515 |
| 78 | EAP message | EAP message | O | TLV-E | 7-1503 |
| | Delay indication | Delay indication | O | TLV | 1 |

The SM message is transmitted from the SMF 121 to the UE 101 in operations 461 and 463.

Afterward, according to an embodiment of the disclosure, in operation 471, a procedure of transmitting the UE configuration update command message from the AMF 111 to the UE 101 may be performed.
(Scheme 3)

Figure 4:
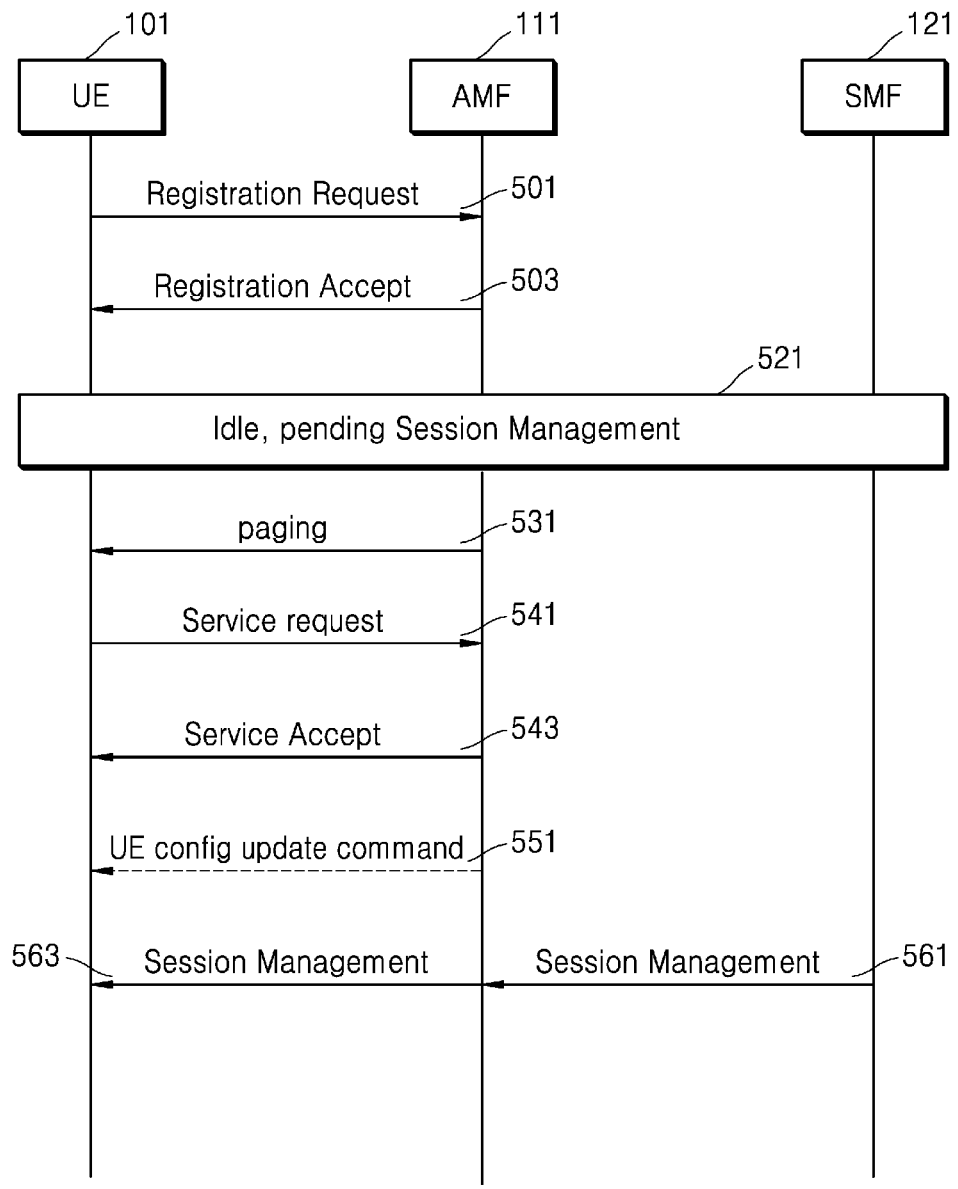
FIG. 4 illustrates a NAS message information processing and communicating procedure in a 5G network environment according to an embodiment of the disclosure.

FIG. 4 illustrates a NAS message information processing and communicating procedure in a 5G network environment according to an embodiment of the disclosure.

In operation 501, the UE 101 transmits a registration request message to the AMF 111.

In operation 503, the AMF 111 transmits a registration Accept message to the UE 101.

In operation 521, the UE 101 is in an idle state, and an SM message transmitted from the SMF 121 to the UE 101 via the AMF 111 is pending.

In operation 531, the AMF 111 performs paging with respect to the UE 101.

In operation 541, the UE 101 transmits a service request message to the AMF 111.

In operation 543, the AMF 111 transmits a service accept message to the UE 101.

Afterward, according to an embodiment of the disclosure, a procedure of transmitting a UE configuration update command message from the AMF 111 to the UE 101 in operation 551 may be omitted.

In this regard, in a legacy method by which, when the UE 101 transitions from the idle state to a connected state in response to the service accept message, a 5G-GUTI is transmitted through a UE configuration update command message so as to avoid a risk of exposure of a 5G-GUTI of the UE 101 due to the idle state, if transmission of the UE configuration update command fails, a backoff timer is set and transmission of the UE configuration update command message is retried 4 times, such that transmission of the SM message is delayed. Therefore, to avoid a delay in transmission of the SM message due to repetition of retransmission of the UE configuration update command message, operation 551 may be omitted.

Also, according to another embodiment of the disclosure, only when transmission of the UE configuration update command fails, i.e., only when a UE configuration update complete message that is a response to the UE configuration update command is not received while T3555 timer is running, the SM message may be first transmitted and then the UE configuration update command may be re-transmitted. To do so, according to an embodiment of the disclosure, a separate preset timer runs such that retransmission of the UE configuration update command may be controlled.

Also, according to another embodiment of the disclosure, the AMF 111 may first transmit the pending SM message, and then may reset timer T3555 and attempt retrying to transmit the UE configuration update command. Because this case corresponds to revision to a legacy procedure and operation, an indication by which the AMF 111 indicates the afore-described capability to the UE 101 may be added.

Afterward, in operations 561 and 563, the SM message may be transmitted from the SMF 121 to the UE 101.

Figure 5:
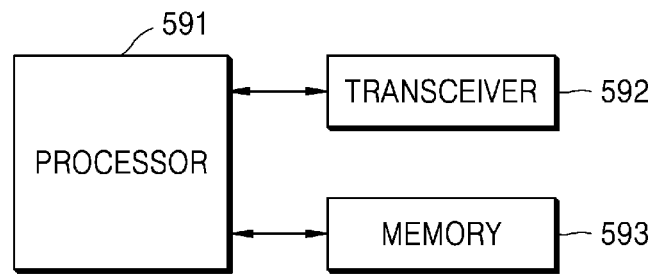
FIG. 5 illustrates a structure of a UE according to an embodiment of the disclosure.

FIG. 5 illustrates a structure of a UE according to an embodiment of the disclosure.

Referring to FIG. 5, the UE may include a processor 501, a transceiver 502, and a memory 503. The processor 501, the transceiver 502, and the memory 503 of the UE may operate according to the communication method of the UE. However, elements of the UE are not limited to an example described above. For example, the UE may include more elements than the afore-described elements or may include fewer elements than the afore-described elements. Furthermore, the processor 501, the transceiver 502, and the memory 503 may be implemented as one chip.

The processor 501 may control a series of processes to allow the UE to operate according to the aforementioned embodiment. In an embodiment, the processor 501 may perform a NAS message information processing and communicating procedure. For example, the processor 501 may transmit a registration request message and may receive a registration Accept message in response to the registration request message, and may transmit a service request message including an indication indicating that it is available to receive a 5G-global unique temporary identifier (5G-GUTI) via a service accept message and may receive a service accept message including a 5G-GUTI. Although only some operations in the embodiments described above with reference to the operation are described as an example, the disclosure is not limited thereto, and the processor 501 may control an entire procedure for the UE to operate according to all or some of the embodiments described above.

The transceiver 502 may transmit or receive a signal to or from a base station or a network entity. In this regard, the signal being transmitted or received to or from the base station or the network entity may include control information and data. To do so, the transceiver 502 may include a radio frequency (RF) transmitter configured to up-convert and amplify a frequency of a signal to be transmitted, and a RF receiver configured to low-noise amplify a received signal and down-convert a frequency thereof. However, the configuration of the transceiver 502 is merely an example, and elements of the transceiver 502 are not limited to the RF transmitter and the RF receiver. Also, the transceiver 502 may receive a signal by using a radio channel and output the signal to the processor 501, and may transmit a signal output from the processor 501, by using a radio channel.

The memory 503 may store programs and data required for the UE to operate. Also, the memory 503 may store control information or data included in a signal obtained by the UE. The memory 503 may include any or a combination of storage media such as read-only memory (ROM), random access memory (RAM), a hard disk, a compact disc (CD)-ROM, and a digital versatile disc (DVD). Also, the memory 503 may correspond to a plurality of memories. In an embodiment of the disclosure, the memory 503 may store a program for supporting beam-based cooperative communication.

Figure 6:
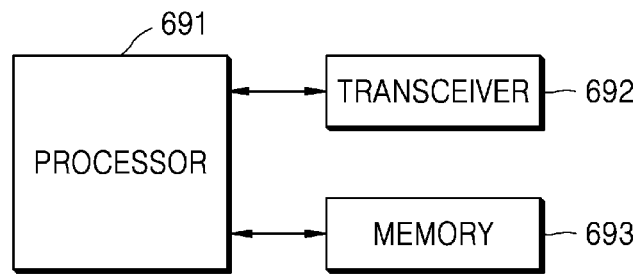
FIG. 6 illustrates a structure of a network entity according to an embodiment of the disclosure.

FIG. 6 illustrates a structure of a network entity according to an embodiment of the disclosure.

Referring to FIG. 6, the network entity may include a processor 601, a transceiver 602, and a memory 603. According to the afore-described communication method by the network entity, the processor 601, the transceiver 602, and the memory 603 of the network entity may operate. However, elements of the network entity are not limited to an example described above. For example, the network entity may include more elements than the afore-described elements or may include fewer elements than the afore-described elements. Furthermore, the processor 601, the transceiver 602, and the memory 603 may be implemented as one chip.

The processor 601 may control a series of processes to allow the network entity to operate according to the aforementioned embodiment. According to an embodiment of the disclosure, the processor 601 may receive a registration request message and may transmit a registration Accept message in response to the registration request message, and may receive a service request message including an indication indicating that it is available to receive a 5G-GUTI via a service accept message and may transmit a service accept message including a 5G-GUTI. Although only some embodiments described above with reference to the operation are described as an example, the disclosure is not limited thereto, and the processor 601 may control an entire procedure for an UE to operate according to all or some of the embodiments described above.

The transceiver 602 may transmit or receive a signal to or from the UE. In this regard, the signal being transmitted or received to or from the UE may include control information and data. To do so, the transceiver 602 may include a RF transmitter configured to up-convert and amplify a frequency of a signal to be transmitted, and a RF receiver configured to low-noise amplify a received signal and down-convert a frequency thereof. However, the configuration of the transceiver 602 is merely an example, and elements of the transceiver 602 are not limited to the RF transmitter and the RF receiver. Also, the transceiver 602 may receive a signal by using a radio channel and output the signal to the processor 601, and may transmit a signal output from the processor 601, by using a radio channel.

The memory 603 may store programs and data required for the network entity to operate. Also, the memory 603 may store control information or data included in a signal obtained by the network entity. The memory 603 may include any or a combination of storage media such as ROM, RAM, a hard disk, a CD-ROM, and a DVD. Also, the memory 603 may correspond to a plurality of memories. In an embodiment, the memory 603 may store a program for supporting beam-based cooperative communication.

Also, the configuration of FIG. 6 may be a configuration of an AMF, and descriptions of each operation of FIG. 6 may correspond to descriptions of each element of the AMF.

The methods according to the embodiments of the disclosure as described herein or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including RAM or flash memory, ROM, electrically erasable programmable read only memory (EEPROM), a magnetic disc storage device, a CD-ROM, a DVD, another optical storage device, or a magnetic cassette. Alternatively, the programs may be stored in memory including a combination of some or all of the above-mentioned storage media. Also, a plurality of such memories may be included.

In addition, the programs may be stored in an attachable storage device accessible through any or a combination of communication networks such as the Internet, an intranet, a local area network (LAN), a wide LAN (WLAN), and a storage area network (SAN). The storage device may be connected, through an external port, to an apparatus according to the embodiments of the disclosure. Another storage device on the communication network may also be connected to the apparatus performing the embodiments of the disclosure.

In the afore-described embodiments of the disclosure, elements included in the disclosure are expressed in a singular or plural form according to the embodiments of the disclosure. However, the singular or plural form is appropriately selected for convenience of description and the disclosure is not limited thereto. As such, an element expressed in a plural form may also be configured as a single element, and an element expressed in a singular form may also be configured as plural elements.

Specific embodiments are described in the descriptions of the disclosure, but it will be understood that various modifications may be made without departing the scope of the disclosure. Thus, the scope of the disclosure is not limited to the embodiments described herein and should be defined by the appended claims and their equivalents. For example, the base station and the UE may be operated in a manner that portions of an embodiment of the disclosure are combined with portions of another embodiment of the disclosure. The embodiments of the disclosure may also be applied to other communication systems, and various modifications based on the technical concept of the embodiments of the disclosure may be made.

The invention claimed is:

1. A method, performed by a user equipment (UE), of processing a non-access stratum (NAS) message, the method comprising:
   receiving a paging request message from an access and mobility management function (AMF);
   transmitting, to the AMF, a service request message while a session management message that is triggered by a session management function (SMF) is pending at the SMF, wherein the UE is in an idle state;
   receiving, from the AMF, a service accept message corresponding to the service request message;
   receiving, from the AMF, the session management message that is triggered by the SMF; and
   after receiving the session management message, receiving a UE configuration update command message from the AMF, wherein a new $5^{th}$ generation-global unique temporary identifier (5G-GUTI) is allocated after receiving the session management message.

2. The method of claim 1, further comprising:
   transmitting a registration request message to the AMF; and
   receiving a registration accept message from the AMF.

3. The method of claim 1, wherein the UE configuration update command message comprises the new 5G-GUTI.

4. A method, performed by an access and mobility management function (AMF), of processing a non-access stratum (NAS) message, the method comprising:
   transmitting a paging request message to a user equipment (UE);
   receiving, from the UE, a service request message while a session management message that is triggered by a session management function (SMF) is pending at the SMF, wherein the UE is in an idle state;
   transmitting, to the UE, a service accept message corresponding to the service request message;
   transmitting, to the UE, the session management message that is triggered by the SMF; and
   after transmitting the session management message, transmitting a UE configuration update command message to the UE, wherein a new $5^{th}$ generation-global unique temporary identifier (5G-GUTI) is allocated after receiving the session management message.

5. The method of claim 4, further comprising:
   receiving a registration request message from the UE; and
   transmitting a registration accept message to the UE.

6. The method of claim 4, wherein the UE configuration update command message comprises the new 5G-GUTI.

7. A user equipment (UE) for processing a non-access stratum (NAS) message, the UE comprising:
   a transceiver; and
   a processor combined with the transceiver and configured to:
   receive a paging request message from an access and mobility management function (AMF),
   transmit, to the AMF, a service request message while a session management message that is triggered by a session management function (SMF) is pending at the SMF, wherein the UE is in an idle state,
   receive, from the AMF, a service accept message corresponding to the service request message,
   receive, from the AMF, the session management message that is triggered by the SMF, and
   after receiving the session management message, receive a UE configuration update command message from the AMF, wherein a new $5^{th}$ generation-global unique temporary identifier (5G-GUTI) is allocated after receiving the session management message.

8. The UE of claim 7, wherein the processor is configured to transmit a registration request message to the AMF, and receive a registration accept message from the AMF.

9. The UE of claim 7, wherein the UE configuration update command message comprises the new 5G-GUTI.

10. An access and mobility management function (AMF) for processing a non-access stratum (NAS) message, the AMF comprising:
- a transceiver; and
- a processor combined with the transceiver and configured to:
  - transmit a paging request message to a user equipment (UE),
  - receive, from the UE, a service request message while a session management message that is triggered by a session management function (SMF) is pending at the SMF, wherein the UE is in an idle state,
  - transmit, to the UE, a service accept message corresponding to the service request message, and
  - transmit, to the UE, the session management message that is triggered by the SMF, and
  - after transmitting the session management message, transmit a UE configuration update command message to the UE, wherein a new $5^{th}$ generation-global unique temporary identifier (5G-GUTI) is allocated after receiving the session management message.

11. The AMF of claim 10, wherein the UE configuration update command message comprises the new 5G-GUTI.

12. The AMF of claim 10, wherein the processor is further configured to receive a registration request message from the UE; and transmit a registration accept message to the UE.

* * * * *